(12) United States Patent
Soong et al.

(10) Patent No.: US 7,974,353 B2
(45) Date of Patent: Jul. 5, 2011

(54) METHOD AND SYSTEM FOR RESOURCE ALLOCATION FOR OFDM WIRELESS NETWORKS

(75) Inventors: Anthony C. K. Soong, Plano, TX (US); Jianmin Lu, San Diego, CA (US); Zhigang Rong, San Diego, CA (US)

(73) Assignee: FutureWei Technologies, Inc., Plano, TX (US)

( * ) Notice: Subject to any disclaimer, the term of this patent is extended or adjusted under 35 U.S.C. 154(b) by 738 days.

(21) Appl. No.: 11/836,725

(22) Filed: Aug. 9, 2007

(65) Prior Publication Data

US 2008/0310528 A1    Dec. 18, 2008

Related U.S. Application Data

(60) Provisional application No. 60/829,526, filed on Oct. 14, 2006, provisional application No. 60/824,284, filed on Aug. 31, 2006.

(51) Int. Cl.
*H04K 1/10* (2006.01)
*H04L 27/28* (2006.01)

(52) U.S. Cl. .......... 375/260; 370/203; 370/208

(58) Field of Classification Search .......... 370/203–211, 370/254; 375/260
See application file for complete search history.

(56) References Cited

U.S. PATENT DOCUMENTS

| | | | |
|---|---|---|---|
| 6,771,987 B1 | 8/2004 | Dam et al. | |
| 2002/0064167 A1 | 5/2002 | Khan et al. | |
| 2002/0151321 A1 * | 10/2002 | Winchell et al. | 455/519 |
| 2003/0027588 A1 | 2/2003 | Futakata et al. | |
| 2003/0067935 A1 | 4/2003 | Hosein | |
| 2003/0202500 A1 | 10/2003 | Ha et al. | |
| 2007/0116024 A1 | 5/2007 | Zhang et al. | |
| 2007/0121946 A1 | 5/2007 | Ito et al. | |
| 2007/0274288 A1 * | 11/2007 | Smith et al. | 370/351 |
| 2008/0025337 A1 | 1/2008 | Smith et al. | |
| 2008/0089354 A1 | 4/2008 | Yoon et al. | |

FOREIGN PATENT DOCUMENTS

CN    1385008 A    12/2002

(Continued)

OTHER PUBLICATIONS

Bi, H., et al. "Rescource Management in VoIP Support," 3GPP2 TSG-C WG3, C30-20060424-036, Apr. 24, 2006, pp. 1-6, 3rd Generation Partnership Project 2.

McBeath, S., et al., "Call Grouping using Bitmap," 3GPP2 TSG-C WG3, C30-20060731-023, Jul. 31, 2006, pp. 1-3, 3rd Generation Partnership Project 2.

(Continued)

*Primary Examiner* — Curtis B Odom
(74) *Attorney, Agent, or Firm* — Slater & Matsil, L.L.P.

(57) ABSTRACT

According to an embodiment, the present invention provides a method for providing resource allocation in a wireless communication network. The method includes providing an access provider that is configured to perform orthogonal frequency division multiplexing (OFDM). The access provider is configured to allocate transmission resources. The method also includes providing a first plurality of terminals that are wirelessly connected to the access provider. The method further includes assigning the first plurality of terminals to a first scheduling group that is associated with a first plurality of resources. The first plurality of resources includes at least a first resource. The method additionally includes providing a second plurality of terminals that are wirelessly connected to the access provider. The method further includes assigning the second plurality of terminals to a second scheduling group that is associated with a second plurality of resources.

24 Claims, 3 Drawing Sheets

FOREIGN PATENT DOCUMENTS

| | | |
|---|---|---|
| CN | 1400805 A | 3/2003 |
| CN | 1416231 A | 5/2003 |
| CN | 1537372 A | 10/2004 |
| CN | 1600005 A | 3/2005 |
| WO | WO 2005/006639 A1 | 1/2005 |
| WO | WO 2005/048614 A | 5/2005 |
| WO | WO 2007/124675 A1 | 11/2007 |

OTHER PUBLICATIONS

Soong, A., et al., "Resource Sharing in VoIP Group for LBC," 3GPP2, C30-20060911-028, Sep. 11, 2006, 8 pages, 3rd Generation Partnership Project 2.

Novak, R., et al., "Group Resource Allocation Bitmap Signaling Enhancement," 3GPP2 TSG-C, C030-20060911-045, Sep. 11, 2006, pp. 1-9, 3rd Generation Partnership Project 2.

Bi, H., et al., "Sharing Persistent Assignments in the Group Resource Allocation," 3GPP2 TSG-C WG3, C30-20060911-100, Sep. 11, 2006, pp. 1-4, 3rd Generation Partnership Project 2.

Bi, H., et al., "Group Resource Allocation Enhancements," 3GPP2 TSG-C WG3, C30-20060911-102, Sep. 11, 2006, pp. 1-9, 3rd Generation Partnership Project 2.

Reed, D., et al., "Reverse Link with VoIP with Group Scheduling," 3GPP2 TSG-C WG3, C30-20060911-103, Sep. 11, 2006, pp. 1-5, 3rd Generation Partnership Project 2.

Zhouyue, P., et al., "VoIP Group Enhancements," 3GPP2, C30-20060911-114, Sep. 11, 2006, pp. 1-4, 3rd Generation Partnership Project 2.

"Group Resource Allocation Components Proposal," 3GPP2 TSG-C WG3, C30-20061204-089, Dec. 4, 2006, pp. 1-21, 3rd Generation Partnership Project 2.

* cited by examiner

METHOD AND SYSTEM FOR RESOURCE ALLOCATION FOR OFDM WIRELESS NETWORKS

CROSS-REFERENCES TO RELATED APPLICATIONS

This application claims priority to U.S. Provisional Application No. 60/824,284, filed Aug. 31, 2006, and U.S. Provisional Application No. 60/829,526, filed Oct. 14, 2006, and is related to U.S. patent application Ser. No. 11/776,326, filed Jul. 11, 2007, all of which are incorporated by reference herein.

BACKGROUND OF THE INVENTION

The present invention relates generally to telecommunication techniques. More specifically, embodiments of the present invention provide system and method for efficiently allocating network resources based on group policies. In an embodiment, the present invention provides a technique for sharing of resources in a wireless communication system. In particular, the present invention provides to a novel method of allowing the mobile station to utilize the free radio resources that can be shared among groups of users. There are other variations as well.

In a wireless multiple access communication system, the wireless traffic channel resource (e.g., bandwidth and time interval) is shared by the wireless terminals (i.e., mobile units or mobile station) that are connected to the communication system in a particular cell. Efficient allocation of this traffic channel resource is important, as it impacts the utilization of the traffic channel resource and the quality of service perceived by individual wireless terminal users. One such wireless communications system is the Orthogonal Frequency Division Multiplexing (OFDM) based Multiple Access system.

OFDMA is a system in which a plurality of users performs multiple access using OFDM. In a conventional OFDMA data transmission apparatus, frequency division and time division are carried out when multiple access is performed. Also, diversity may be carried out in a frequency division and a time division to improve an error correction capability.

Compared with many other multiplexing schemes, OFDM utilizes a somewhat unique system design approach. It can be thought of as a combination of modulation and multiple access scheme that segments a communications channel in such a way that many users can share it. Whereas TDMA is based on time division and CDMA is based on code division, OFDM is based on frequency division. OFDM is a technique that divides the spectrum into a number of equally spaced tones, and carries a portion of a user's information on each tone. Each of these tones can be thought of as a frequency subcarrier. OFDM can be viewed as a form of frequency division multiplexing (FDM). However, OFDM has an important special property that each tone is orthogonal with every other tone. FDM typically requires frequency guard bands between the frequencies so that they do not interfere with each other. In contrast, OFDM allows the spectrum of each tone to overlap. Since tones under OFDM are orthogonal, they do not interfere with one another. By allowing the tones to overlap, the overall amount of spectrum required is reduced, thereby increasing the channel availability.

The OFDM technique is often considered as a multiple access technique, as an individual tone or groups of tones can be assigned to different users. For example, multiple users share a given bandwidth, thus yielding a system called orthogonal frequency division multiple access, or OFDMA. Each user can be assigned a predetermined number of tones when they have information to send, or alternatively, a user can be assigned a variable number of tones based on the amount of information they have to send. The assignments are controlled by the media access control (MAC) layer, which schedules the resource assignments based on user demand.

To fully benefit from the OFDM technology, it is often important to use effective and efficient mechanisms for resource allocation. Over the past, various conventional resource allocation techniques have been developed. Unfortunately, these conventional techniques have been inadequate as discussed below.

Therefore, it is desirable to have an improved system and method of resource allocation for OFDM systems.

BRIEF SUMMARY OF THE INVENTION

The present invention relates generally to telecommunication techniques. More specifically, embodiments of the present invention provide system and method for efficiently allocating network resources based on group policies. In an embodiment, the present invention provides a technique for sharing of resources in a wireless communication system. In particular, the present invention provides to a novel method of allowing the mobile station to utilize the free radio resources that can be shared among groups of users. There are other variations as well.

The present invention addresses one or more of the issues discussed above by providing methods and systems that can be advantageously utilized to allow multiple users to share resources. The present invention finds utility in a wide variety of applications.

An objective of this invention is to use the existing bitmap signaling in bitmap control one or bitmap control two to signal the left over resource to the mobile stations in the sharing group.

Another objective of this invention is to signal the resources available for the mobile stations in the sharing group with minimal or no increase in the signaling overhead.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

It should be understood that any one of the features of the invention may be used separately or in combination with other features. It should be understood that features which have not been mentioned herein may be used in combination with one or more of the features mentioned herein. Other systems, methods, features, and advantages of the present invention will be or become apparent to one with skill in the art upon examination of the drawings and detailed description. It is intended that all such additional systems, methods, features, and advantages be included within this description, be within the scope of the present invention, and be protected by the accompanying claims.

According to an embodiment, the present invention provides a method for providing resource allocation in a wireless communication network. The method includes providing an access provider that is configured to perform orthogonal frequency division multiplexing (OFDM). The access provider is configured to allocate transmission resources. The method also includes providing a first plurality of terminals that are wirelessly connected to the access provider. The method further includes assigning the first plurality of terminals to a first scheduling group that is associated with a first plurality of resources. The first plurality of resources includes at least a first resource. The method additionally includes providing a second plurality of terminals that are wirelessly connected to the access provider. The method further includes assigning the second plurality of terminals to a second scheduling group that is associated with a second plurality of resources. The second plurality of resources includes at least a part of the first resource. The method also includes providing a first message including a first bitmap and a second bitmap. The first bitmap indicates status information associated with the first scheduling group. The second bitmap includes N number of bits. The N number of bits indicates a first correspondence between the first plurality of terminals and the first plurality of resources in a first of order. The second bitmap includes a first portion and a second portion. The first portion indicates resources allocated to the first plurality of terminals. The second portion indicates resources assigned to a first terminal that is assigned to the second scheduling group. The method further includes providing a second message indicating a first resource allocation. The second message includes a third bitmap and a fourth bitmap. The third bitmap indicates status information associated with the second scheduling group. The fourth bitmap includes M number of bits. The M number of bits indicates a second correspondence between the second plurality of terminals and the second plurality of resources in a second of order. The fourth bitmap includes a third portion and a fourth portion. The third portion indicates resources allocated to the second plurality of terminals. The fourth portion indicates resources assigned to a second terminal. The second terminal is assigned to the first scheduling group.

According to another embodiment, the present invention provides a method for utilizing resources in a wireless communication network. The method includes providing a first terminal that is configured to perform wireless communication. The method also includes connecting to an access provider that is configured to perform orthogonal frequency division multiplexing (OFDM). The access provider is configured to allocate transmission resources. The method further includes associating the first terminal with a first scheduling group. The method additionally includes receiving a resource allocation message. The resource allocation message includes a first bitmap and a second bitmap. The first bitmap includes a first bit. The first bit indicates a transmission status of the first terminal. The second bitmap includes a first portion and a second portion. The first portion indicates resources allocated to the first scheduling group. The second portion indicates resources allocated to a second scheduling group. In addition, the method includes determining whether the first terminal is active based on a value of the first bit. Furthermore, the method includes determining an amount of resources allocated to the first terminal based on first portion of the second bitmap if the first terminal is active. Moreover, the method includes performing wireless communication using the amount of resources.

According to yet another embodiment, the present invention provides a system for providing resource allocation in a wireless communication network. The system includes an access provider that is configured to perform orthogonal frequency division multiplexing (OFDM). The access provider is configured to allocate transmission resources. The system also includes a first plurality of terminals that is wirelessly connected to the access provider. The first plurality of terminals is assigned to a first scheduling group that is associated with a first plurality of resources. The first plurality of resources includes at least a first resource. The system additionally includes a second plurality of terminals that is wirelessly connected to the access provider. The second plurality of terminals is assigned to a second scheduling group. The second scheduling group is associated with a second plurality of resources. The second plurality of resources includes at least the a part of the first resource. The access provider is configured to generate a first message including a first bitmap and a second bitmap. The first bitmap indicates status information associated with the first scheduling group. The second bitmap includes N number of bits. The N number of bits indicates a first correspondence between the first plurality of terminals and the first plurality of resources in a first of order. The second bitmap includes a first portion and a second portion. The first portion indicates resources allocated to the first plurality of terminals. The second portion indicates resources assigned to a first terminal. The second terminal is assigned to the second scheduling group. The access provider is configured to generate a second message indicating a first resource allocation. The second message includes a third bitmap and a fourth bitmap. The third bitmap indicates status information associated with the second scheduling group. The fourth bitmap includes M number of bits. The M number of bits indicates a second correspondence between the second plurality of terminals and the second plurality of resources in a second of order. The fourth bitmap includes a third portion and a fourth portion. The third portion indicates resources allocated to the second plurality of terminals. The fourth portion indicates resources assigned to a second terminal. The first terminal is assigned to the first scheduling group.

It is to be appreciated that embodiments of the present invention provides numerous advantages over conventional techniques. Among other things, but providing resource allocation information associated with transmission resources (e.g., frequency channels, frames, etc.). According to embodiments, different scheduling groups are allowed to share transmission resources without causing conflicts. For example, resource sharing can be accomplished by new schemes using bitmaps to indicate resource availability. By using bitmaps according to embodiments of the present invention, the complexity of the mobile station operation is reduced by minimizing the number of bitmaps that the mobile station has to monitor. For example, a mobile station only needs to monitor the bitmaps from its own group (e.g., bitmap 1 and 2 but not bitmap 3 and 4). It is to be appreciated that bitmap signaling schemes according to the embodiment of the present invention cost no more transmission resources when compared to conventional signals schemes. In addition, it is to be appreciated that embodiments of the present invention is easily implemented with conventional systems. For example, embodiments of the present invention can be implemented in conventional systems by modifying software component, with little or no hardware modification necessary. There are other advantages as well.

Depending upon embodiment, one or more of these benefits may be achieved. These benefits and various additional objects, features and advantages of the present invention can be fully appreciated with reference to the detailed description and accompanying drawings that follow.

DETAILED DESCRIPTION OF THE INVENTION

The present invention relates generally to telecommunication techniques. More specifically, embodiments of the present invention provide system and method for efficiently allocating network resources based on group policies. In an embodiment, the present invention provides a technique for sharing of resources in a wireless communication system. In particular, the present invention provides to a novel method of allowing the mobile station to utilize the free radio resources that can be shared among groups of users. There are other variations as well.

As discussed above, conventional techniques for resource allocation in OFDM systems are inadequate for various reasons, which are specifically explained below.

In a current proposed enhancement to the CDMA2000 air interface, a group resource allocation scheme was proposed where a plurality of mobile stations are placed into a scheduling group. Each scheduling group share a common set of time frequency resources. The allocation of the time frequency resources to each of the mobile stations in the scheduling group is controlled by bitmap signaling.

In a bitmap control scheme, two bitmaps are used to control the time frequency resource allocated to each user. The first bitmap, called bitmap 1, is used to indicate which mobile station is being served in each frame or channel. For example, each bit location of bitmap 1 will correspond to a mobile station in the scheduling group. A mobile station is active, (i.e. receiving data), if its corresponding bit is set to 1. A mobile station is inactive, (i.e. not receiving data), if its corresponding bit is set to 0.

The second bitmap, referred to as bitmap 2, is used to indicate the amount of time frequency resources being allocated to each active mobile station. For example, the first bit of bitmap 2 corresponds to the first active user in bitmap 1 (call active user 1), the second bit of bitmap 2 corresponds to the second active user (call active user 2), the third bit of bitmap 2 corresponds to the third active user (call active user 3), and so on. The time frequency resources are allocated consecutively from the active user 1 to the last active user. A "1" in bitmap 2 indicates that M time frequency resources will be assigned while a zero indicates N time frequency resources will be assigned. For example, M is greater than N.

In another bitmap control scheme, the first bitmap, called bitmap 1, is used to indicate which mobile station in the scheduling group will have a new packet transmission in this time interval. Each bit in bitmap 1 is associated with a mobile station in the scheduling group. A "1" in the bitmap 1 indicates that this mobile station has a new packet transmission while a "0" indicates that this mobile station does not have a new packet transmission. For example, the mobile station associated with the first one in bitmap 1 is called the new packet mobile one, the second one in bitmap 1 is called the new packet mobile two and so on. The second bitmap, call bitmap 2, is a one-to-one mapping to the time frequency resources shared by the scheduling group. A "1" in bitmap 2 indicates that this time frequency resource is currently being use while a "0" indicates that the time frequency resource is not being used. The new packet mobile one looks at bitmap 2 and will know that the first unused time frequency resource will be assigned to it. Similarly, the new packet mobile two looks at bitmap 2 and will know that the second unused time frequency resource will be assigned to it. And so on.

The conventional bitmap signaling techniques are useful in allocating resources within a signal group. However, these techniques do not allow resource sharing among users from different groups that are connected to the same base station. As a result, oftentimes leftover resources at each group can only be used by the users at the same group, thereby increasing the overall overhead. More specifically, in order to minimize the signaling to change the size of the common set of time frequency resources for the scheduling group, the size of the time frequency resources are not always completely utilized by the users in the scheduling group. As a result, it is desirable to have a second group of users, which is hereby referred to as the sharing group, to be associated with the scheduling group to use the left over resources not used by the scheduling group, as provided by embodiments of the present invention.

To allow resource sharing among different groups, typically time frequency resource of multiple groups are overlapped, partially or completely. In an OFDM network, this is typically referred to as scheduling resource group sharing. For example, two scheduling group, scheduling group A and scheduling group B, have a region of their time frequency resource that are common to both group. That is part of the time frequency resource of scheduling group A may be the same as part of the time frequency resource of scheduling group B.

In the case of scheduling resource group sharing, the conventional mechanism for signaling to the sharing group the resources that can be shared is by explicitly signaling the resource in a control channel. This method is extremely costly in terms of overhead. The present invention will detail a way of signaling the unused resources in the case of scheduling resource group sharing to the sharing group through the existing bitmap signaling with minimal or no increase in the signaling overhead.

According to embodiments of the present invention, to ensure that there is no overlap of time frequency resources assigned to different mobiles stations (i.e., resulting in conflicting assignment for the same resource), the time frequency resources for each group are assigned using a different ordering pattern. For example, scheduling group A will assign the resources in ascending order and scheduling group B will assign the resources in descending order.

Among other things, the present invention provides methods and systems to support sharing of radio resources in an OFDMA-based communication system. It is to be appreciated that the following description provides many different embodiments and examples therefore, for implementing various features and/or aspects of the present invention. Specific examples of components, signals, messages, protocols, and arrangements are described below to simplify the present disclosure. These are merely examples and are not intended to limit the invention from that described in the claims. Some elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art. Details regarding control circuitry described herein are omitted, as such control circuits are within the skills of persons of ordinary skill in the relevant art.

In accordance to a specific embodiment, two bitmaps controls are used for scheduling. The bitmap control 1 is used to control the scheduling group. The control bitmap 2 is used to denote the time frequency resources that are used by the scheduling group mobile station. In addition, the control bitmap 2 is also used to signal the resources that are occupied by other scheduling group that are doing scheduling group resource sharing with the present scheduling group. For example, the control bitmap 2 is also used to indicate the available leftover resource that can be used by the sharing group mobile stations. The signaling of the resources used by the other scheduling groups is accomplished using the bits that are not associated with the active users in bitmap 1. More specifically, the signaling in bitmap 2 is accomplished by an explicit one-to-one mapping to the resource used by the other scheduling group. For example, a "1" in bitmap 2 would indicate that the resource is being used by the other scheduling group.

Figure 1:
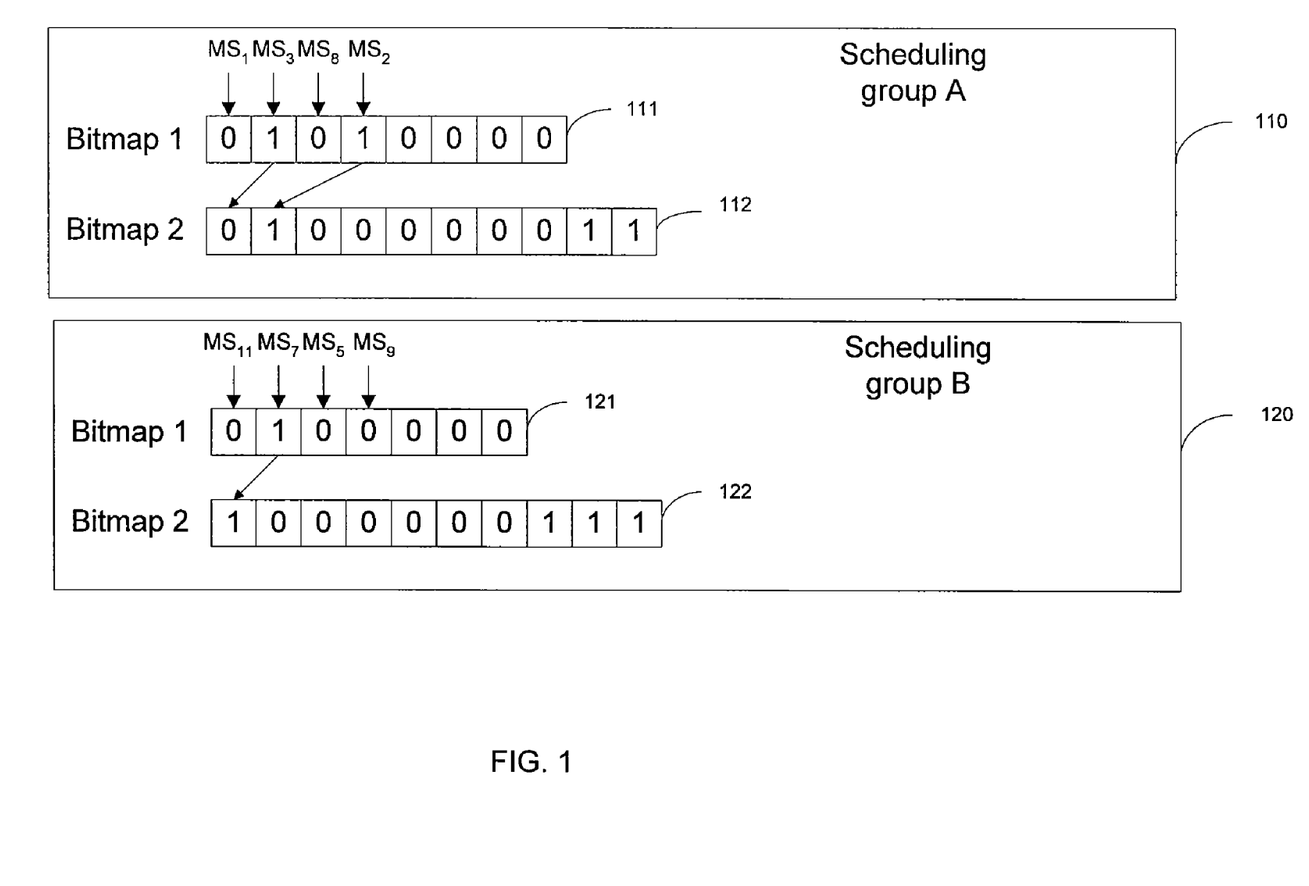
FIG. 1 illustrates an example of bitmap signaling for bitmap control 1 to indicate the resources for the sharing group.

FIG. 1 is a simplified diagram illustrating a bitmap scheme according to an embodiment of the present invention. This diagram is merely an example, which should not unduly limit the scope of the claims. One of ordinary skill in the art would recognize many variations, alternatives, and modifications. It is to be understood that while FIG. 1 shows the scheduling group A 110 and the scheduling group B 120, there can be other scheduling groups as well. Each of the scheduling groups are associated with, among other things, two bitmaps. For example, the bitmap 111 provides status indication as whether a user is active or inactive. The bitmap 112 provides information related to the amount of resources that is assigned to active users. In certain embodiments, the bitmap 111 and the bitmap 112 are transmitted together as a single bitmap.

As shown in FIG. 1, time frequency resources for scheduling group A and scheduling group B are completely overlapping. For example, the scheduling groups share a totally of 10 units (e.g., channel, frame, etc) of time frequency resources. For the purpose of discussion, the 10 units of resources are referred sequentially as units 1 through 10. More specifically, a "1" in bitmap 2 (e.g., bitmaps 112 and 122) indicates that two time frequency resources are associated with the corresponding active user while a "0" indicates that one time frequency resource is associated with the active user. For resource allocation indicated by bitmap 2, the scheduling group A 110 assigns resources in an ascending order while scheduling group B 120 assigns the resources in descending order. For example, the bitmap 112 sequentially assigns resources units in an order of 1 through 10. The bitmap 122 sequentially assigns resources units in an order of 10 through 1. According to embodiments of the present invention, the bitmap 2 for each scheduling group has two portions: left portion and the right portion. The left portion indicates the amount of time frequency resource allocated to users of the scheduling group. The right portion indicates the overlapping time frequency resource units that is used by users of other scheduling group.

The bitmap 111, which is the bitmap 1 for the scheduling group A, indicates that MS3 and MS2 are active. For example, the bits that corresponds the MS3 and MS2 have the value of "1", which denotes the active status for the user. The bitmap 112, which is the bitmap 2 for scheduling group A, indicates that MS3 is assigned time frequency resource unit 1 (i.e., a "0" corresponds to one unit of time frequency resource) and MS2 is assigned time frequency resource units 2 and 3 (i.e., a "1" corresponds to two unit of time frequency resource).

The bits from the right hand side or the right portion of bitmap 2, as explained above, are not associated with active users of the same group. For example, the "1" at the right side of the bitmap 112 is not used to indicate the resource units assigned to and/or used by the users at the scheduling group A. For example, the two "1" at the right side of the bitmap 112 indicates that the resource units 9 and 10 are assigned to and/or used by users from other scheduling groups. Instead, the right side of the bitmap 112 indicates the units of resources that are assigned to and/or used by users from the scheduling group B. For example, the MS7 of the scheduling group B is assigned 2 units of resources (i.e., resource units 10 and 9, in an descending sequence in bitmap 122). In short, the right portion of the bitmaps 112 and 122 are used to indicate if the time frequency resources are used by the other scheduling groups. In this illustrative example, bitmap 2 (i.e., bitmap 112) of the scheduling group A indicates that time frequency resources 9 and 10 are used by the other scheduling groups. Therefore, mobile stations in sharing groups (e.g., scheduling group B) that is sharing the leftover resources of scheduling group A look at both bitmap 1 and bitmap 2 of scheduling group A determine that time frequency resources units 1, 2, 3, 9, and 10 are used and that time frequency resources units 4, 5, 6, 7, and 8 are leftover resources that they can use.

To understand why time frequency resources 9 and 10 are denoted as used by scheduling group B, the bitmaps of scheduling group B are also shown in FIG. 1. In this case, bitmap 1 (i.e., bitmap 121) shows that MS7 is active and that bitmap 2 (i.e., bitmap 122) shows that MS7 is assigned 2 units of time frequency resources. As discussed above, the scheduling group B assigns resources in a descending order. Thus the MS7is assigned resource units 9 and 10. The other bits of bitmap 2 (i.e., bitmap 122 as shown) that are not associated with the active users in bitmap 1 of scheduling group B also shows that the first three time frequency resources are used by scheduling group A. The mapping of the time frequency resources used in bitmap 2 is determined accordingly. The last three bits (i.e., right side bits) of bitmap 2 correspond to the units time frequency resources used by the other scheduling groups. In this particular example, the last three bits of the bitmap 122 have the value of "1", indicating that the resource units 1, 2, 3 are used by other scheduling groups (e.g., scheduling group A).

Figure 2:
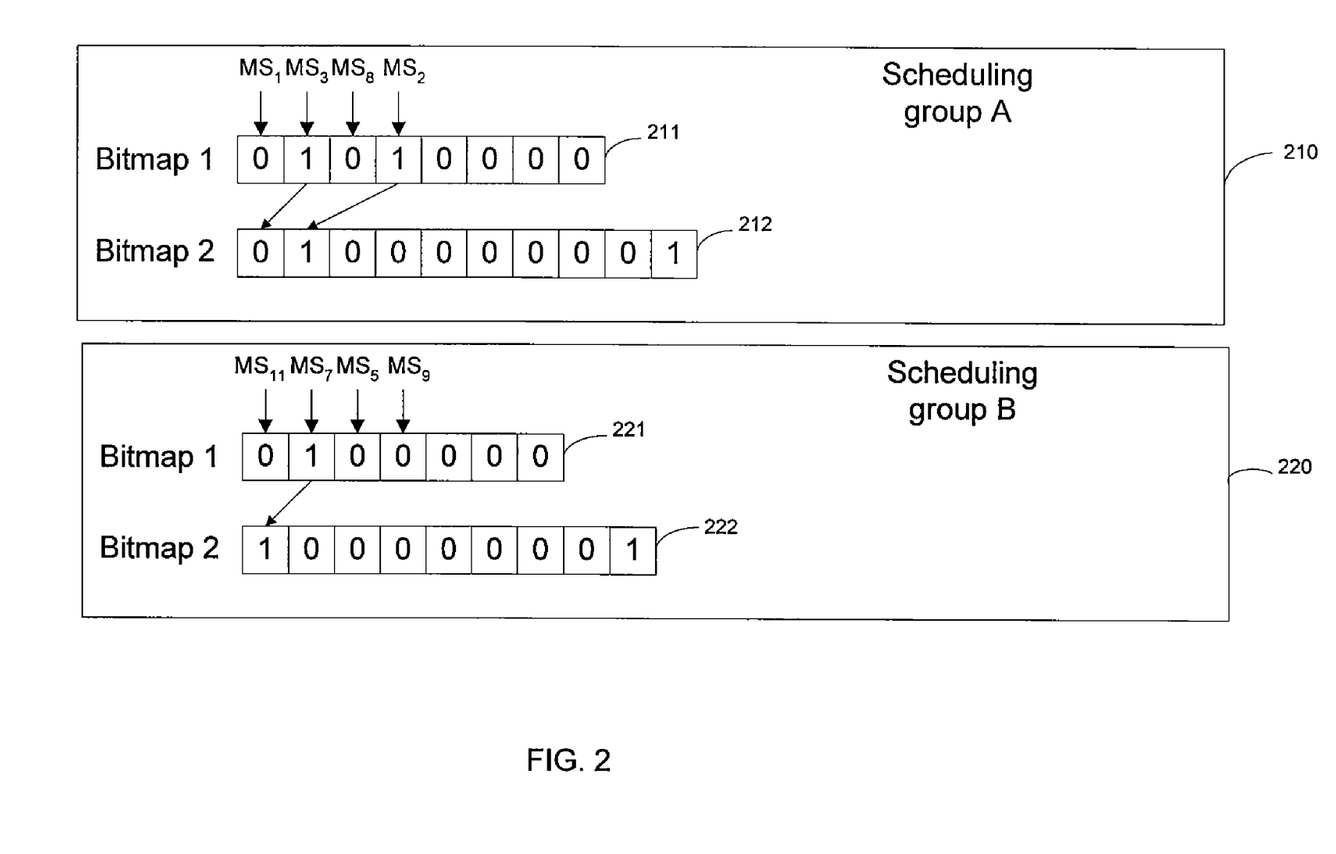
FIG. 2 provides an illustrative example of the signaling to indicate the resources for the sharing group in bitmap control 1 where the resources for the scheduling groups are partially overlapped.

As explained above, FIG. 1 provides an illustrative example where the time frequency resources of the two scheduling group are completely overlapping. FIG. 2 is a simplified diagram illustrating a partial overlapping resource sharing according to an embodiment of the present invention. This diagram is merely an example, which should not unduly limit the scope of the claims. One of ordinary skill in the art would recognize many variations, alternatives, and modifications.

As shown in FIG. 2, the set up of scheduling group A and scheduling group B is the similar to scheduling groups illustrated in FIG. 1. However, there are some important differences. The scheduling group A 210 is using time frequency resources units 1 to 10 while scheduling group B 220 is using scheduling resources units 3 to 11. As can be seen from bitmap 2 (i.e., bitmap 212) of scheduling group A, time frequency resources units 1, 2, and 3 are used by scheduling group A users (i.e., MS3 and MS2) while time frequency resource unit 10 is used by the scheduling group B. Bitmap 2 (i.e., bitmap 222) of scheduling group B shows that the MS7is assigned scheduling resource 10 and 11 and that the time frequency resource unit 3 is used by scheduling group A. Thus the users in the sharing group with scheduling group A will know that time frequency resources 4, 5, 6, 7, 8, and 9 are free for sharing. It is thus clear that if the scheduling groups share X time frequency resource units and the scheduling group is scheduling time frequency resource units from 0 to P, the mapping of the bits in bitmap 2 of the scheduling group that controls that are not associated with active users in bitmap 1 is as follows: the last bit of bitmap 2 will indicated if the resource P−X is used by other scheduling group(s), the second last bit of bitmap 2 will indicated if the resource P−X+1 is used by the other scheduling group, the third last bit of bitmap 2 will indicated if the resource P−X+2 is used by the other scheduling group. And so on.

In accordance to yet another embodiment of the invention, the signaling of the free time frequency resource unit is indicated by an explicitly denotation of the number of free time frequency resource units and/or the size of the time frequency resource the base station intends to assign to users in the sharing group using the bits of bitmap 2 that are not associated with the active users of bitmap 1. For example, since the one boundary between the occupied time frequency resources and the free time frequency resources can be obtained form the bits associated with the active users in bitmap 1, the free time frequency resource is then delineated if a boundary and length are provided.

Figure 3:
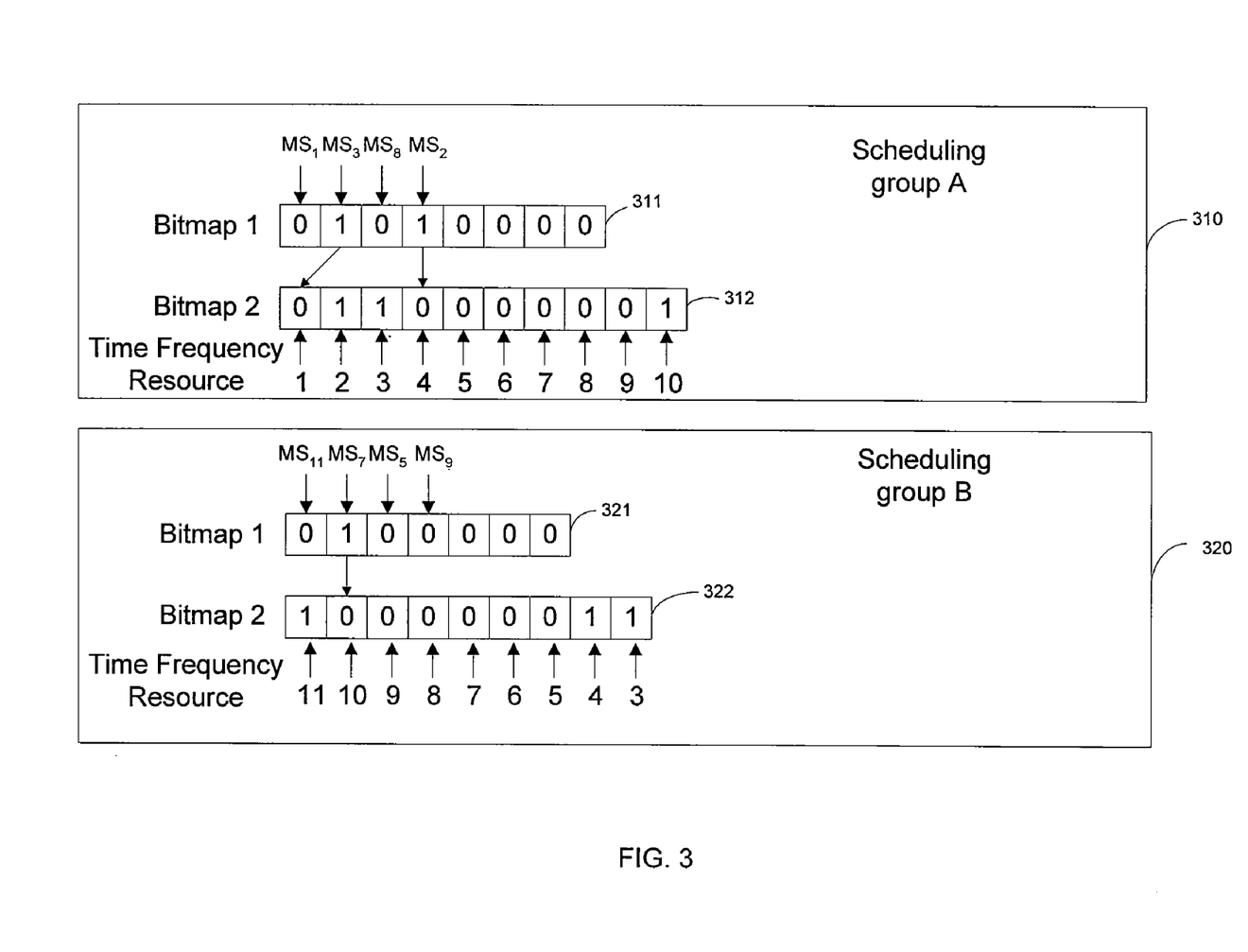
FIG. 3 provides an illustrative example of the signaling to indicate the resources for the sharing group in bitmap control 2.

In accordance to an embodiment of the invention, the bitmap control 2 is used to control the scheduling group. For example, this control bitmap 2 is used to not only denote the time frequency resources that are used by the scheduling group mobile station, but it is also used to signal the resources that are occupied by other scheduling group that are doing scheduling group resource sharing with the present scheduling group. In this case, a one-to-one explicit mapping between the bits in bitmap 2 and the time frequency resource is used. More specifically, the bitmap signals all time frequency resources, including those used by the other scheduling group(s), by a "1" when the time frequency resource cannot be used for the initial transmission of a packet in this interval. As a way of an example, FIG. 3 is provided FIG. 3 is a simplified diagram illustrating bitmap signaling according to an embodiment of the present invention. This diagram is merely an example, which should not unduly limit the scope of the claims. One of ordinary skill in the art would recognize many variations, alternatives, and modifications. FIG. 3 shows that time frequency resources units for the scheduling group A 310 and the scheduling group B 320. For example, the scheduling group A is scheduling time frequency resource units 1 to 10, and scheduling group B is scheduling time frequency resource 3 to 11. The bitmap 1 (i.e., bitmap 311) in the scheduling group A indicates that MS3 and MS2 are active (e.g., having data and/or voice transmission). The bitmap 2 (i.e., bitmap 312) in the scheduling group A indicates that MS3 is assigned time frequency resource unit 0 and MS2 is assigned time frequency resource unit 4. The other other bits of bitmap 2 (i.e., bitmap 312) that are not associated with active users are now used to indicate if the time frequency resources are used by the other scheduling groups. In this illustrative example, bitmap 2 (i.e., bitmap 312) of the scheduling group A shows that time frequency resource 10 is used by the other scheduling groups. Therefore, the mobile station in the sharing group that is sharing the leftover resources of scheduling group A that looks at bitmap 1 and bitmap 2 of scheduling group A knows that time frequency resources 1, 2, 3, 4, and 10 are used and that time frequency resources 5,6,7,8 and 9 are left over resources that they can use.

The bitmap 1 (i.e., bitmap 321) of the scheduling group B shows that the MS7is active (e.g., scheduled to have a new packet transmission). The MS7 will look at bitmap 2 (i.e., bitmap 322) of the scheduling group B and see that time frequency resource 10 is assigned to it. The bitmap 2 (i.e., bitmap 322) also indicates the time frequency resources units used by scheduling group A, which is the time frequency resources units 3 and 4. Therefore a user that is a member of the sharing group that is sharing the left over resources of scheduling group B knows that time frequency resources 3, 4, 10 and 11 are occupied and that time frequency resources 5, 6, 7, 8, 9, and 10 are available as leftover resources for utilization.

In another embodiment of the invention, the mobile station in the sharing group of scheduling group A will detect all of the bitmaps from all the scheduling groups that share a part of the their scheduled time frequency resource with this scheduling group. In so doing it can determine the free resource as that not used.

It is to be appreciated that embodiments of the present invention provides numerous advantages over conventional techniques. Among other things, but providing resource allocation information associated with transmission resources (e.g., frequency channels, frames, etc.). According to embodiments, different scheduling groups are allowed to share transmission resources without causing conflicts. For example, resource sharing can be accomplished by new schemes using bitmaps to indicate resource availability. It is to be appreciated that bitmap signaling schemes according to the embodiment of the present invention cost no more transmission resources when compared to conventional signals schemes. In addition, it is to be appreciated that embodiments of the present invention is easily implemented with conventional systems. For example, embodiments of the present invention can be implemented in conventional systems by modifying software component, with little or no hardware modification necessary. There are other advantages as well.

The previous description of the disclosed embodiments is provided to enable those skilled in the art to make or use the present invention. Various modifications to these embodiments will be readily apparent to those skilled in the art and generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for providing resource allocation in a wireless communication network, the method comprising:
   providing an access provider, the access provider being configured to perform orthogonal frequency division multiplexing (OFDM), the access provider being configured to allocate transmission resources;
   providing a first plurality of terminals, the first plurality of terminals being wirelessly connected to the access provider;
   assigning the first plurality of terminals to a first scheduling group, the first scheduling group being associated with a first plurality of resources, the first plurality of resources including at least a first resource;
   providing a second plurality of terminals, the second plurality of terminals being wirelessly connected to the access provider;
   assigning the second plurality of terminals to a second scheduling group, the second scheduling group being associated with a second plurality of resources, the second plurality of resources including at least the first resource;
   providing a first message including a first bitmap and a second bitmap, the first bitmap indicating status information associated with the first scheduling group, the second bitmap including N number of bits, the N number of bits indicating a first correspondence between the first plurality of terminals and the first plurality of resources in a first of order, second bitmap including a first portion and a second portion, the first portion indicating resources allocated to the first plurality of terminals, the second portion indicating resources assigned to a first terminal, the first terminal being assigned to the second scheduling group; and providing a second message indicating a first resource allocation, the second message including a third bitmap and a fourth bitmap, the third bitmap indicating status information associated with the second scheduling group, the fourth bitmap including M number of bits, the M number of bits indicating a second correspondence between the second plurality of terminals and the second plurality of resources in a second of order, the fourth bitmap including a third portion and a fourth portion, the third portion indicating resources allocated to the second plurality of terminals, the fourth portion indicating resources assigned to a second terminal, the second terminal being assigned to the first scheduling group.

2. The method of claim 1 wherein the first bitmap and the second bitmap are a part of a same bitmap.

3. The method of claim 1 wherein the wireless communication network is in compliance with a CDMA2000 standard.

4. The method of claim 1 wherein the access provider comprises a base station.

5. The method of claim 1 wherein the access provider comprises an access node.

6. The method of claim 1 wherein the first plurality of terminals comprises a mobile station.

7. The method of claim 1 wherein:
the first order is an ascending order; and
the second order is a descending order.

8. The method of claim 1 further comprising a third plurality of terminals, the third plurality of terminals being assigned to a third scheduling group.

9. The method of claim 1 wherein each bit of the N number of bits corresponds to a unit of transmission resource.

10. The method of claim 1 wherein:
each bit of the N number of bits indicates transmission resources being assigned to a corresponding terminal;
a "0" value indicates that one unit of transmission resources being assigned to the corresponding terminal; and
a "1" value indicates that two or more units of transmission resources being assigned to the corresponding terminal.

11. The method of claim 1 wherein the transmission resources comprise frequency channels.

12. The method of claim 1 wherein the transmission resources comprise frames.

13. The method of claim 1 wherein the transmission resources comprise OFDM symbol durations.

14. A method for utilizing resources in a wireless communication network, the method comprising:
providing a first terminal, the first terminal being configured to perform wireless communication;
connecting to an access provider, the access provider being configured to perform orthogonal frequency division multiplexing (OFDM), the access provider being configured to allocate transmission resources;
associating the terminal with a first scheduling group, the first scheduling group including a plurality of terminals;
receiving a resource allocation message, the resource allocation message in each frame including a first bitmap and a second bitmap, the first bitmap including a first bit, the first bit indicating a transmission status of the first terminal, the second bitmap including a first portion and a second portion, the first portion indicating resources allocated to the first scheduling group, the second portion indicating resources allocated to a second scheduling group;

receiving another resource allocation message, the another resource allocation message including a third bitmap and a fourth bitmap, the third bitmap including a third bit, the third bit indicating a transmission status of a terminal associated with the second scheduling group, the fourth bitmap including M number of bits, the M number of bits indicating a second correspondence between a plurality of terminals of the second scheduling group and the access provider in a second order, the fourth bitmap including a third portion and a fourth portion, the third portion indicating resources allocated to the second scheduling group, the fourth portion indicating resources allocated to the first scheduling group;

determining whether the first terminal is active based on a value of the first bit;

determining an amount of resources allocated to the first terminal based on the first portion of the second bitmap if the first terminal is active; and performing wireless communication using the amount of resources.

15. The method of claim 14 further determining a resource allocation associated with the second scheduling group.

16. The method of claim 14 wherein the first terminal is in compliance with the CDMA2000 standard.

17. The method of claim 14 further comprising:
determining leftover resources using the second bitmap; and
using the leftover resources for data communication.

18. The method of claim 14 further comprising monitoring the second scheduling group.

19. The method of claim 14, wherein the second bitmap includes N number of bits, the N number of bits indicating a first correspondence between the plurality of terminals of the first scheduling group and the access provider in a first order.

20. A system for providing resource allocation in a wireless communication network, the system comprising:
an access provider, the access provider being configured to perform orthogonal frequency division multiplexing (OFDM), the access provider being configured to allocate transmission resources;
a first plurality of terminals, the first plurality of terminals being wirelessly connected to the access provider, the first plurality of terminals being assigned to a first scheduling group, the first scheduling group being associated with a first plurality of resources, the first plurality of resources including at least a first resource; and
a second plurality of terminals, the second plurality of terminals being wirelessly connected to the access provider, the second plurality of terminals being to a second scheduling group, the second scheduling group being associated with a second plurality of resources, the second plurality of resources including at least the first resource;
wherein:
the access provider is configured to generate a first message including a first bitmap and a second bitmap, the first bitmap indicating status information associated with the first scheduling group, the second bitmap including N number of bits, the N number of bits indicating a first correspondence between the first plurality of terminals and the first plurality of resources in a first of order, second bitmap including a first portion and a second portion, the first portion indicating resources allocated to the first plurality of terminals, the second portion indicating resources assigned to a first terminal, the first terminal being assigned to the second scheduling group; and the access provider is configured to generate a second message indicating a first resource allocation, the second message including a third bitmap and a fourth bitmap, the third bitmap indicating status information associated with the second scheduling group, the fourth bitmap including M number of bits, the M number of bits indicating a second correspondence between the second plurality of terminals and the second plurality of resources in a second of order, the fourth bitmap including a third portion and a fourth portion, the third portion indicating resources allocated to the second plurality of terminals, the fourth portion indicating resources assigned to a second terminal, the second terminal being assigned to the first scheduling group.

21. The system of claim 20 wherein the first bitmap and the second bitmap are a part of a same bitmap.

22. The system of claim 20 wherein the access provider comprises a base station.

23. The system of claim 20 further comprising a third plurality of terminals.

24. The system of claim 20 wherein the first plurality of terminals and the second plurality of terminals are associated with different locations.

* * * * *